(12) United States Patent
Brink et al.

(10) Patent No.: US 11,711,469 B2
(45) Date of Patent: Jul. 25, 2023

(54) CONTEXTUALIZED SPEECH TO TEXT CONVERSION

(71) Applicant: INTERNATIONAL BUSINESS MACHINES CORPORATION, Armonk, NY (US)

(72) Inventors: Ryan Brink, Raleigh, NC (US); Andrew R. Freed, Cary, NC (US); Marco Noel, Quebec (CA)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/316,615

(22) Filed: May 10, 2021

(65) Prior Publication Data

US 2022/0360668 A1    Nov. 10, 2022

(51) Int. Cl.
*H04M 3/493*    (2006.01)
*G10L 15/22*    (2006.01)
*H04M 3/51*    (2006.01)

(52) U.S. Cl.
CPC ........... *H04M 3/4936* (2013.01); *G10L 15/22* (2013.01); *H04M 3/5166* (2013.01); *G10L 2015/223* (2013.01)

(58) Field of Classification Search
None
See application file for complete search history.

(56) References Cited

U.S. PATENT DOCUMENTS 6,173,266 B1   1/2001  Marx
6,232,358 B1   5/2001  Haraguchi et al.
(Continued)

FOREIGN PATENT DOCUMENTS

CN    1273851 A    11/2000
CN   111522909 A    8/2020
(Continued)

OTHER PUBLICATIONS

International Search Report and Written Opinion for PCT/CN2022/084329 completed May 26, 2022, 10 pgs.
(Continued)

*Primary Examiner* — Hemant S Patel
(74) *Attorney, Agent, or Firm* — George S. Blasiak; David Mattheis; Heslin Rothenberg Farley & Mesiti P.C.

(57) ABSTRACT

Methods, computer program products, and systems are presented. The methods, computer program products, and systems can include, for instance: determining, in performance of an interactive voice response (IVR) session, prompting data for presenting to a user, and storing text based data defining the prompting data into a data repository; presenting the prompting data to the user; receiving return voice string data from the user in response to the prompting data; generating a plurality of candidate text strings associated to the return voice string of the user; examining the text based data defining the prompting data; augmenting the plurality of candidate text strings in dependence on a result of the examining to provide a plurality of augmented candidate text strings associated to the return voice string data; and evaluating respective ones of the plurality of augmented candidate text strings associated to the return voice string data; and selecting one of the augmented candidate text strings as a returned transcription associated to the return voice string data.

20 Claims, 9 Drawing Sheets

(56) References Cited

U.S. PATENT DOCUMENTS

| | | | |
|---|---|---|---|
| 6,574,469 | B1 | 6/2003 | Xiang et al. |
| 6,799,169 | B1 | 9/2004 | Coffman et al. |
| 8,073,681 | B2 | 12/2011 | Baldwin et al. |
| 9,318,110 | B2 | 4/2016 | Roe |
| 9,626,969 | B2 | 4/2017 | Zavaliagkos et al. |
| 9,858,256 | B2 | 1/2018 | Hager |
| 2005/0144187 | A1* | 6/2005 | Che ................ G10L 15/22 704/E15.044 |
| 2006/0009973 | A1* | 1/2006 | Nguyen ........... G10L 15/22 704/E15.04 |
| 2012/0016671 | A1 | 1/2012 | Jaggi et al. |
| 2018/0350390 | A1 | 12/2018 | Shellef et al. |
| 2019/0164062 | A1 | 5/2019 | Moura et al. |
| 2020/0027444 | A1 | 1/2020 | Prabhavalkar et al. |
| 2020/0151219 | A1 | 5/2020 | Anand et al. |
| 2020/0285699 | A1* | 9/2020 | Nogima .......... G10L 15/063 |
| 2020/0312312 | A1 | 10/2020 | Galustyan et al. |

FOREIGN PATENT DOCUMENTS

| | | | |
|---|---|---|---|
| JP | 6220762 | B2 | 10/2017 |
| JP | 6232358 | B2 | 11/2017 |
| JP | 6574469 | B2 | 9/2019 |
| WO | WO2020256749 | A1 | 12/2020 |

OTHER PUBLICATIONS

Mell, Peter, et al., "The NIST Definition of Cloud Computing", NIST Special Publication 800-145, Sep. 2011, Gaithersburg, MD, 7 pgs.

"SFSpeechRecognitionTaskHint" | Apple Developer Documentation. Retrieved on May 10, 2021 from the Internet URL: <https://developer.apple.com/documentation/speech/sfspeechrecognitiontaskhint>, 2 pgs.

"4 Ways to Change a Statement to Question" | WikiHow. Retrieved on May 10, 2021 from the Internet URL: <https://www.wikihow.com/Change-a-Statement-to-Question>, 9 pgs.

"Recognizing Speech in Live Audio" | Apple Developer Documentation. Retrieved on May 10, 2021 from the Internet URL: <https://developer.apple.com/documentation/speech/recognizing_speech_in_live_audio>, 4 pgs.

"SFSpeechRecognitionRequest" | Apple Developer Documentation Retrieved on May 10, 2021 from the Internet URL: <https://developer.apple.com/documentation/speech/sfspeechrecognitionrequest>, 2 pgs.

* cited by examiner

CONTEXTUALIZED SPEECH TO TEXT CONVERSION

BACKGROUND

Embodiments herein relate generally to speech to text conversion and specifically to contextualized speech to text conversion.

Data structures have been employed for improving operation of computer system. A data structure refers to an organization of data in a computer environment for improved computer system operation. Data structure types include containers, lists, stacks, queues, tables and graphs. Data structures have been employed for improved computer system operation, e.g., in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: determining, in performance of an interactive voice response (IVR) session, prompting data for presenting to a user, and storing text based data defining the prompting data into a data repository; presenting the prompting data to the user; receiving return voice string data from the user in response to the prompting data; generating a plurality of candidate text strings associated to the return voice string of the user; examining the text based data defining the prompting data; augmenting the plurality of candidate text strings in dependence on a result of the examining to provide a plurality of augmented candidate text strings associated to the return voice string data; and evaluating respective ones of the plurality of augmented candidate text strings associated to the return voice string data; and selecting one of the augmented candidate text strings as a returned transcription associated to the return voice string data.

In another aspect, a computer program product can be provided. The computer program product can include a computer readable storage medium readable by one or more processing circuit and storing instructions for execution by one or more processor for performing a method. The method can include, for example: determining, in performance of an interactive voice response (IVR) session, prompting data for presenting to a user, and storing text based data defining the prompting data into a data repository; presenting the prompting data to the user; receiving return voice string data from the user in response to the prompting data; generating a plurality of candidate text strings associated to the return voice string of the user; examining the text based data defining the prompting data; augmenting the plurality of candidate text strings in dependence on a result of the examining to provide a plurality of augmented candidate text strings associated to the return voice string data; and evaluating respective ones of the plurality of augmented candidate text strings associated to the return voice string data; and selecting one of the augmented candidate text strings as a returned transcription associated to the return voice string data.

In a further aspect, a system can be provided. The system can include, for example a memory. In addition, the system can include one or more processor in communication with the memory. Further, the system can include program instructions executable by the one or more processor via the memory to perform a method. The method can include, for example: determining, in performance of an interactive voice response (IVR) session, prompting data for presenting to a user, and storing text based data defining the prompting data into a data repository; presenting the prompting data to the user; receiving return voice string data from the user in response to the prompting data; generating a plurality of candidate text strings associated to the return voice string of the user; examining the text based data defining the prompting data; augmenting the plurality of candidate text strings in dependence on a result of the examining to provide a plurality of augmented candidate text strings associated to the return voice string data; and evaluating respective ones of the plurality of augmented candidate text strings associated to the return voice string data; and selecting one of the augmented candidate text strings as a returned transcription associated to the return voice string data.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
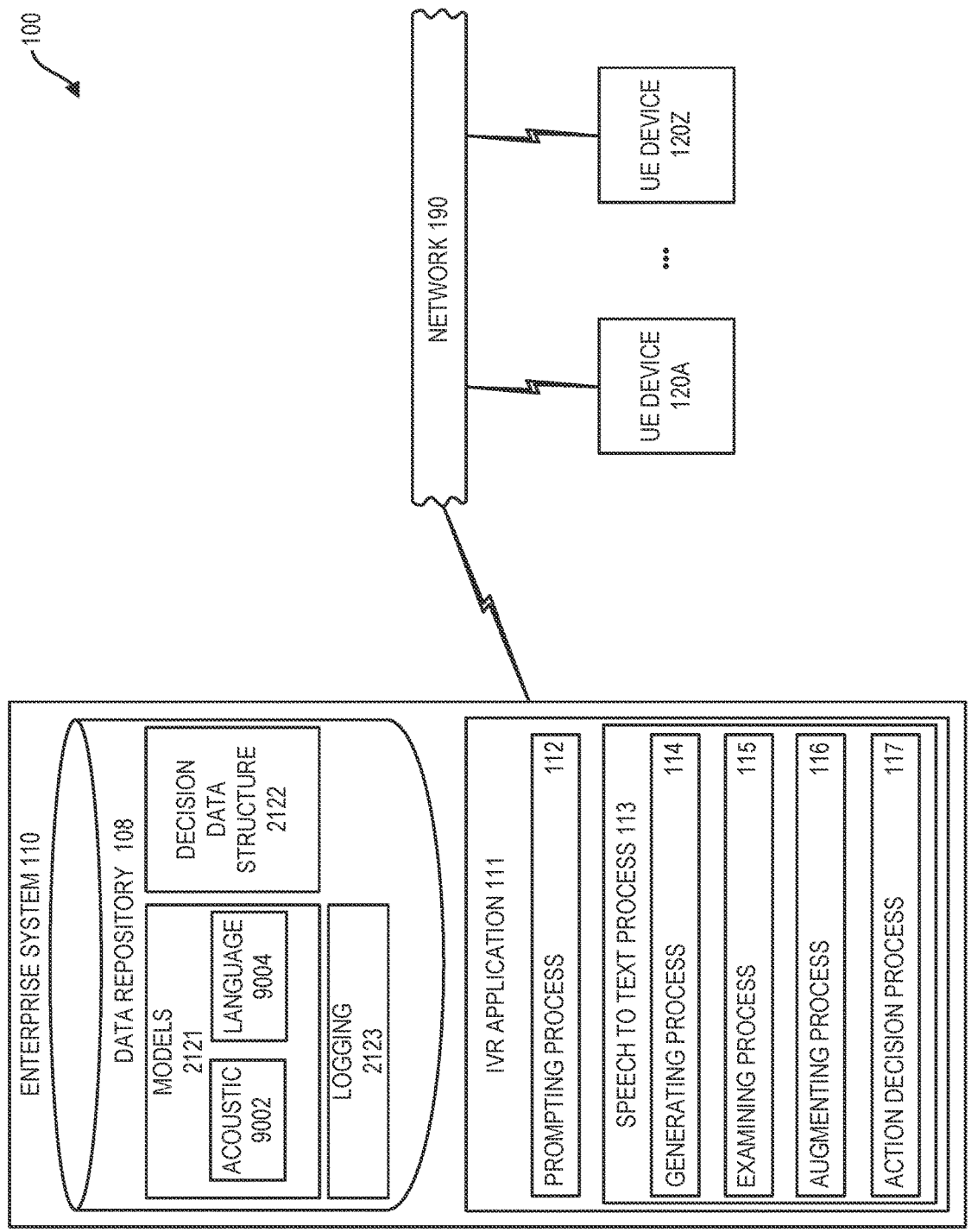
FIG. 1 depicts a system having an enterprise system running an interactive voice response (IVR) application and a plurality of UE devices according to one embodiment.

System 100 for transcription of user voice data is shown in FIG. 1. System 100 can include enterprise system 110 having an associated data repository and user equipment (UE) devices 120A-120Z. System 100 can include numerous devices which may be computing node-based devices connected by network 190. Network 190 can be a physical network and/or a virtual network. A physical network can be, for example, a physical telecommunications network connecting numerous computing nodes or systems such as computer servers and computer clients. A virtual network can, for example, combine numerous physical networks or parts thereof into a logical virtual network. In another example, numerous virtual networks can be defined over a single physical network.

According to one embodiment, enterprise system 110 can be external to UE devices 120A-120Z. According to one embodiment, enterprise system 110 can be co-located with one or more UE devices, UE devices 120A-120Z.

Each of the different UE devices 120A-120Z can be associated to a different user. Regarding UE devices 120A-120Z, a computer device of one or more UE devices 120A-120Z, in one embodiment, can be a computing node device provided by a client computer, e.g., a mobile device, e.g., a smartphone or tablet, a laptop, smartwatch or PC that runs one or more program, e.g., including a web browser for opening and viewing web pages.

Embodiments herein recognize that challenges persist to the accurate recognition of speech in which speech to text transcription is employed. Embodiments herein recognize that one approach in situations where inaccuracies are observed with speech to text conversions can be to deploy additional specifically trained predictive models trained with training data specific to the situation. In one example, embodiments herein recognize that an interactive voice response (IVR) system can be characterized by N conversation stages, each corresponding to a specific node in a dialog tree. One approach for improving the accuracy of an IVR system can be to provide N specific conversation stage predictive models, each corresponding to a specific conversation stage of the IVR system, and training each of the respective N conversation stage predictive models with historical training data of the respective ones of the N conversation stage predictive models. Embodiments herein recognize that while such an approach can improve accuracy of speech to text conversions and can remain useful for augmentation of embodiments set forth herein, management tasks as well as computing resource requirements of the system can increase substantially. Additional processes can comprise separately logging training data for N different conversation stages, separately training and maintaining the N different conversation stage specific predictive models, and separately querying different ones of the N different conversation stage specific predictive models in runtime.

Figure 2:
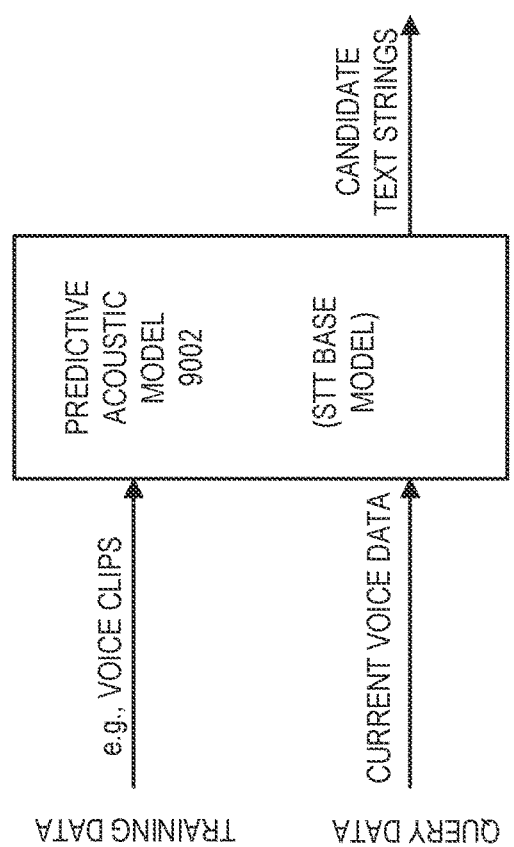
FIG. 2 depicts a predictive model according to one embodiment.

Data repository 108 can store various data. Data repository 108 in models area 2121 can store predictive models that are queried by enterprise system 110. Predictive models stored in models area 2121 can include predictive acoustic model 9002 representing one or more language model which can respond to query data provided by audio voice data for return of candidate text strings associated to the input voice data. As indicated in FIG. 2, predictive acoustic model 9002 can be trained with use of training datasets that comprise audio voice clips mapped to phoneme sets.

Figure 3:
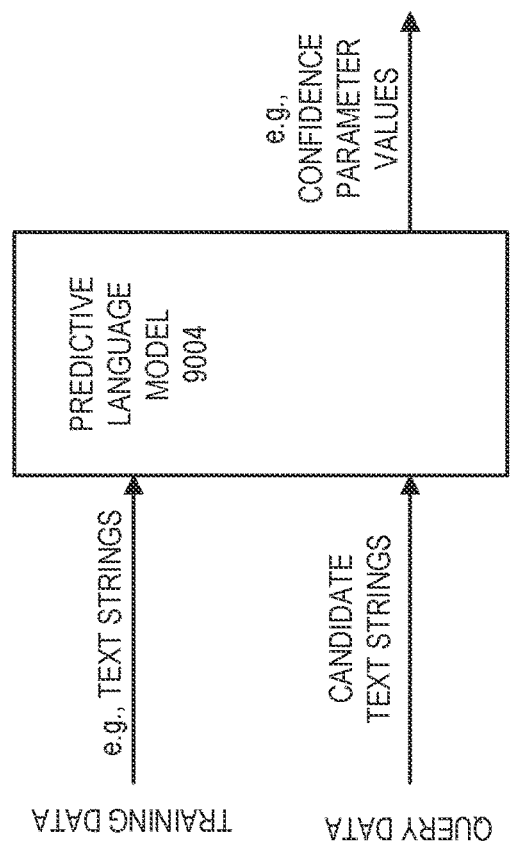
FIG. 3 depicts a predictive model to one embodiment.

Predictive models in models area 2121 can also include predictive language model 9004 representing one or more language models. The one or more language models can include one or more text based language models. As indicated by FIG. 3, predictive language model 9004 can be trained with training data that comprises text strings which define an overall language. In some use cases, different language models can be provided for different topic domains. Trained with training data that comprises text strings, predictive language model 9004 can learn patterns that exist within a language such as terms that commonly appear in association with one another.

Predictive language model 9004 can be provided by a general language model or a conversation stage specific language model. In one embodiment, data repository in models area 2121 can store a control registry which specifies states and attributes of predictive language models associated to respective ones of conversation stages of an interactive voice response (IVR) application 111.

Data repository 108 in decision data structure area 2122 can store, e.g., dialog decision trees and decision tables for return of action decisions by enterprise system 110. In one use case, enterprise system 110 can execute an interactive voice response (IVR) application 111 to run an IVR session which can present voice prompts to a user. In one use case, a speech to text process 113 can be employed within an interactive voice response application (IVR). The IVR application prompting data provided by a virtual agent (VA) can be guided with use of a decision data structure provided by a dialog tree. The dialog decision tree can provide a guide for conversation flow between a user and the VA.

In logging area 2123, data repository 108 can store conversation logging data for historical IVR sessions. The conversation logging data can include text based prompting data of a virtual agent (VA), as well as text based response data of a user input in response to prompting data as converted with use of text to speech conversion. For logged IVR sessions, the conversation data can include tags which specify the conversation stage and mapping dialog tree node for differentiated conversation segments. The conversation logging data can also include, e.g., user ID tags, start tags, end tags and the like.

In one embodiment, enterprise system 110 can run IVR application 111. Enterprise system 110 can run various processes. Enterprise system 110 running IVR application 111 can include enterprise system 110 running prompting process 112 and speech to text process 113. Speech to text process 113 can include various processes such as generating process 114, examining process 115, augmenting process 116, and action decision process 117.

Enterprise system 110 running prompting process 112 can include enterprise system 110 presenting prompting data to a user on a UE device. Enterprise system 110 running prompting process 112 can include enterprise system 110 using dialog decision tree that guides conversation between a virtual agent and a user. Depending on the stage of customer support, different prompts can be presented. Various inputs can be provided for determination of a particular VA prompt. Inputs that can be used to determine prompting data presented by a VA can include, e.g., parameter values indicating the stage of an IVR session, the prior response data of the user, and the current sentiment of the user. Upon being presented with the prompting data by a VA by the running of prompting process 112 of IVR application 111, a user can return response data. Response data can be provided by voice data of a user and can be picked up by an audio input device of a UE device of the user.

In response to receipt of voice data from a user, enterprise system 110 can process and receive voice data by running speech to text process 113. Enterprise system 110 running speech to text process 113 can include enterprise system 110 running generating process 114, examining process 115, augmenting process 116, and action decision process 117.

Enterprise system 110 running generating process 114 can include enterprise system 110 generating candidate text strings from a voice data input. Enterprise system 110 running generating process 114 can include enterprise system 110 querying predictive acoustic model 9002 for return of candidate text strings. Predictive acoustic model 9002 can be trained with use of voice data training data and can be optimized to be responsive to voice data. Predictive acoustic model 9002, according to one embodiment, can perform various subprocesses, such as voice clip segmentation, phoneme classification, and speaker identification.

Enterprise system 110 miming examining process 115 can include enterprise system 110 examining a context of received voice data from a user. The context of received voice data can include prompting data presented to the user preceding the received voice data of the user. Embodiments herein recognize that examining prompting data preceding received voice data can be useful in enhancing speech to text conversion of the received voice data. Enterprise system 110 running examining process 115 can include enterprise system 110 examining prompting data presented to the user preceding the received voice data of the user. Enterprise system 110 running examining process 115 can include enterprise system 110 examining prompting data to identify sentence attributes of the preceding prompting data.

Enterprise system 110 miming augmenting process 116 can include enterprise system 110 augmenting candidate text strings provided by generating process 114 using one or more result of the examining process 115. Enterprise system 110 running augmenting process 116 can include enterprise system 110 adding text data to a candidate text string generated by generating process 114 in dependence on one or more result of examining process. Enterprise system 110 miming augmenting process 116 can include enterprise system 110 adding text data to the first through Nth candidate text strings generated by generating process 114 to provide first through Nth candidate text strings in dependence on an attribute of prompting data determined by the miming of examining process 115.

Enterprise system 110 running action decision process 117 can include enterprise system 110 performing an action decision to select between the first through Nth candidate text string provided using the augmented text string returned by the running augmenting process 116. Enterprise system 110 running action decision process 117 can include enterprise system 110 querying predictive language model 9004, which can be configured as a language model with the respective augmented candidate text strings. Predictive language model 9004 can be configured so that in response to query data defined by the augmented candidate text strings, predictive language model 9004 can return a confidence score associated to respective ones of the augmented candidate text strings, wherein the confidence score indicates a determined likelihood of the augmented candidate text string accurately representing the intended utterance of the user. Enterprise system 110 running action decision process 117 can include selecting as the determined transcribed utterance of the user, the augmented candidate text string having the highest confidence score.

Figure 4:
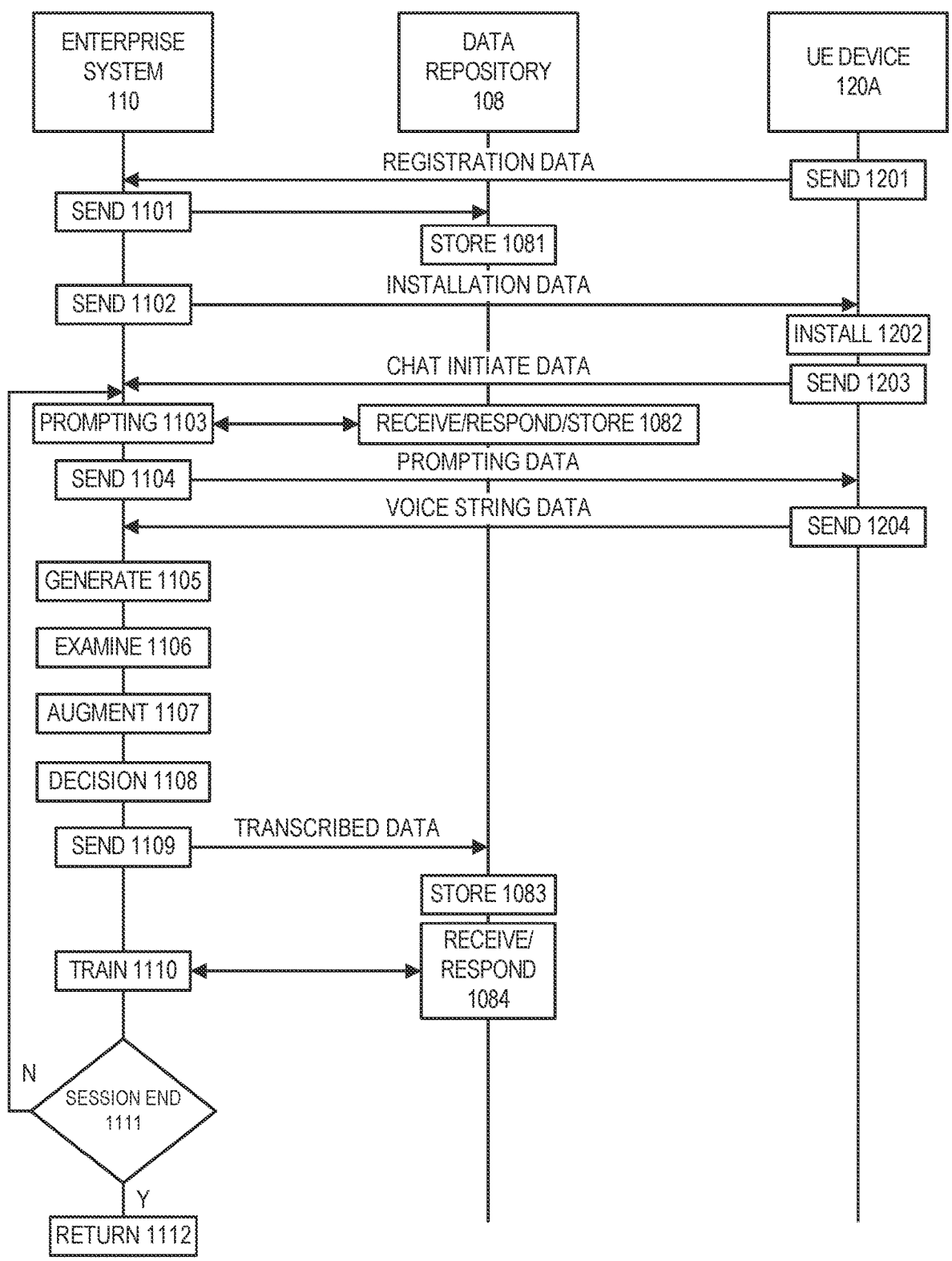
FIG. 4 is a flowchart illustrating a method for performance by an enterprise system interoperating with a UE device according to one embodiment.
Figure 5:
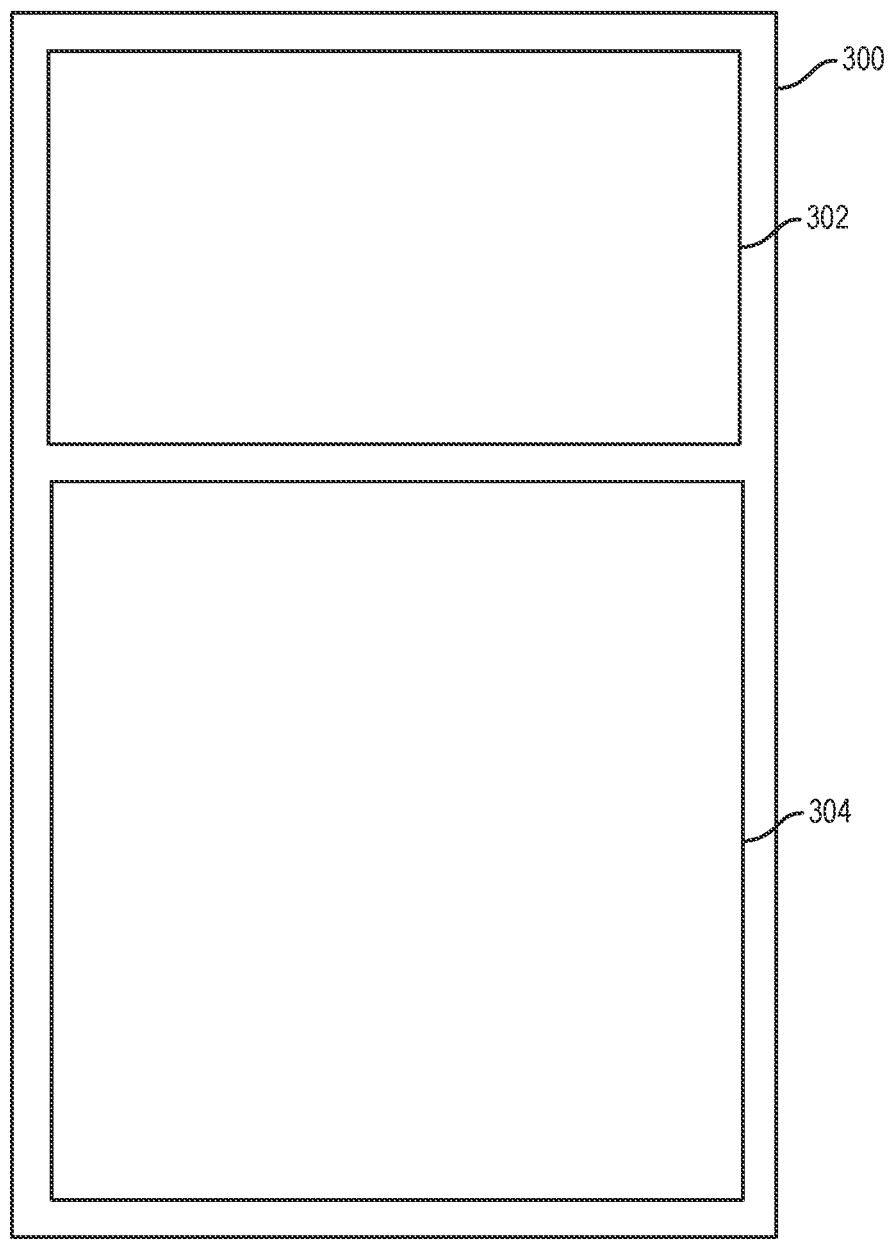
FIG. 5 depicts a user interface according to one embodiment.

A method for performance by enterprise system 110 interoperating with a UE device 120A is described with reference to the flowchart at FIG. 4. At block 1201, UE device 120A can be sending user defined registration data for receipt by enterprise system 110. The registration data can be user defined registration data defined using a user interface such as user interface 300 depicted in FIG. 5. The user interface 300 can be a displayed user interface displayed on a display of UE device 120A, and can include area 302 for text based data entry by a user and area 304 for presentment of text based data and/or graphical data to a user. The registration data can include, e.g., contact data of the user and permissions data of the user which permits enterprise system 110 to use various data of the user, including voice data set forth herein. In response to the receipt of the registration data, enterprise system 110 can proceed to block 1101. At block 1101, enterprise system 110 can send the received registration data from the user for storage in data repository 108. The registration data can be stored by data repository 108 at block 1081.

At block 1102, enterprise system 110 can send an installation package for receipt and installation by UE device 120A to receive and install block 1202. The installation package data can include an installation package which is installed on UE device 120A. The installation package can include, e.g., libraries in executable code that can augment the performance of UE device 120A to operate within system 100. In some embodiments, provisioning data received by UE device 120A from enterprise system 110 can be minimal and UE device 120A can operate as a thin client. In other embodiments, the method depicted in the flowchart of FIG. 4 can be absent of block 1102, and UE device 120A can be provisioned for optimized operation within system 100 with use of webpage data transmitted to UE device 120A at the commencement of a communication session. For example, in some embodiments, the described IVR features can be performed during a web browsing session in which provisioning data facilitating optimized operation of UE device 120A within system 100 is received with returned web pages received from enterprise system 110 during a browsing session. In other embodiments, the method depicted in the flowchart of FIG. 4 can be absent of block 1102, and UE device 120A can be minimally provisioned to transmit voice data to enterprise system 110. The registration process depicted at blocks 1201, 1101, and 1081 can be informal, e.g., in the case enterprise system 110 registers a user as a guest user.

With a user of UE device 120A registered into system 100 and with permissions presented to enterprise system 110, UE device 120A can proceed to block 1203. At block 1203, UE device 120A can send chat initiating data for receipt by enterprise system 110. Chat initiating data can be sent by UE device 120A at block 1203 by way of a user of UE device 120A activating an appropriate control, e.g., initiating a voice call and/or clicking on voice chat button on displayed user interface 300.

In response to the receipt of the chat initiate data, enterprise system 110 can proceed to block 1103. At block 1103, enterprise system 110 can run prompting process 112 to present prompting data to a user. Prompting data presented to a user can be in the form of voice prompting data output on an audio output device of UE device 120A and/or can include text prompting data for display in area 302 (FIG. 5) on user interface 300 of UE device 120A. In an initial pass of block 1103, the prompting data can include, for example, baseline greeting data that is predetermined. In response to determining prompting data at block 1103, enterprise system 110 can proceed to block 1104.

Figure 6:
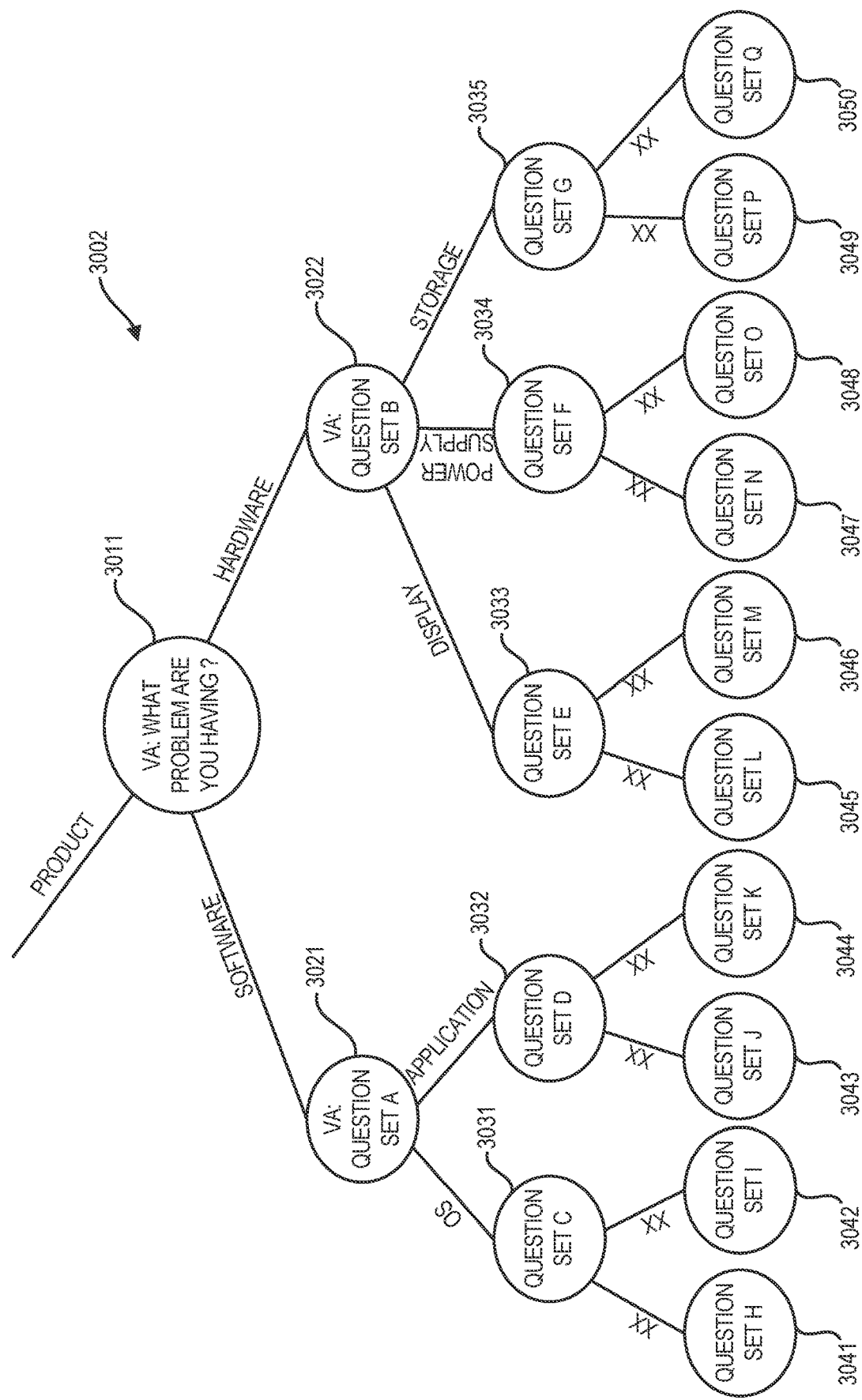
FIG. 6 depicts a dialog decision tree for guiding an IVR session according to one embodiment.

In one embodiment, enterprise system 110 can use dialog decision tree 3002 as set forth in FIG. 6 for determination of VA prompting data for presentment to a user determined at block 1103. At block 1103, enterprise system 110 can return an artificial intelligence (AI) response decision, i.e., can determine a response for presentment by a VA defined by enterprise system 110 to the user that is intelligently generated based on most recently received voice data of a user, or can be controlled by content of a root node in case the IVR session has just been initiated. In one aspect, enterprise system 110 can reference dialog decision tree 3002 as shown in FIG. 6 for return of an AI response decision.

A segment of a dialog decision tree for activation after an initial greeting is shown by node 3011 of dialog decision tree 3002. The dialog decision tree 3002 of FIG. 6 can control the flow of conversation between a VA and a user in a customer service scenario, and the respective nodes can define conversation stages of an IVR session. In reference to the dialog decision tree of FIG. 6, nodes can encode content subject to examination for determining questions of VA and edges between nodes can define IVR session intents which can be determined by examining transcribed responses of a user to VA questions. For a given set of response data of a user, enterprise system 110 can employ semantic analysis to classify the response data into a selected intent from a set of candidate intents. Embodiments herein recognize that determination of a proper decision state can be dependent on providing an accurate transcription of a user's speech. Enterprise system 110 can be configured to reference dialog decision tree 3002 for return of an action decision as to the next VA question to present to a user participating in a current IVR session. For the intent indicated by the edge entitled "product", a VA voice response can be predetermined as depicted by node 3011 which designates the predetermined VA response of "What problem are you having?". In other scenarios such as indicated by the intents referenced by the edges entitled "software" and "hardware", the response of a VA can be selected from a menu of candidate question sets, e.g., the question set A for node 3021 or the question set B for node 3022. Enterprise system 110 can be configured to determine IVR prompting data for presentment to a user based on a wide range of parameter value, e.g., parameter values indicating the stage of an IVR session as indicated by the currently active node of dialog decision tree 3002, the prior response data of the user, and the current sentiment of the user. In some scenarios, prior response data and/or current sentiment of the user can be used to select from candidate questions encoded for a conversation stage defined by a dialog tree node. In some scenarios, prior response data and/or current sentiment of the user can be used to modify baseline prompting data associated to a conversation stage node. It should be noted that in some embodiments a large variety of dialog decision trees can potentially be activated by enterprise system 110 in response to certain received voice data of a user. In the middle of an IVR session, enterprise system 110 can deactivate a first dialog decision tree and can activate a second dialog decision tree. Dialog decision tree 3002 can include nodes 3011, 3021-3022, 3031-3035, and 3041-3050 defining respective conversation stages of an IVR session.

Enterprise system 110 running IVR application 111 can perform natural language processing (NLP) for extraction of NLP output parameter values from received voice data of user, as well as prompting data from a VA. Enterprise system 110 can include enterprise system 110 performing one or more of a topic classification process that determines topics of messages and outputs one or more topic NLP output parameter value, a sentiment analysis process which determines sentiment parameter value for a message, e.g., polar sentiment NLP output parameters, "negative," "positive," and/or non-polar NLP output sentiment parameters, e.g., "anger," "disgust," "fear," "joy," and/or "sadness" or other classification process for output of one or more other NLP output parameter values, e.g., one of more "social tendency" NLP output parameter or one or more "writing style" NLP output parameter, and/or one or more part of speech NLP output parameter value. Part-of-speech tagging methodologies can include use of, e.g., Constraint Grammar, Brill tagger, Baum-Welch algorithm (the forward-backward algorithm) and the Viterbi algorithm which can employ use of the Hidden Markov models. Hidden Markov models can be implemented using the Viterbi algorithm. The Brill tagger can learn a set of rule patterns, and can apply those patterns rather than optimizing a statistical quantity. Applying natural language processing can also include performing sentence segmentation which can include determining where a sentence ends, including, e.g., searching for periods, while accounting for periods that designate abbreviations.

Enterprise system 110 performing natural language processing can include enterprise system 110 performing (a) topic classification and output of one or more topic NLP output parameter for a received message, (b) sentiment classification and output of one or more sentiment NLP output parameter value for a received message, or (c) other NLP classifications and output of one or more other NLP output parameter for the received message. Topic analysis for topic classification and output of NLP output parameter values can include topic segmentation to identify several topics within a message. Topic analysis can apply a variety of technologies, e.g., one or more of hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment, sentiment analysis can classify the polarity of a given text as to whether an expressed opinion is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

At block 1104, enterprise system 110 can send prompting data to UE device 120A for presentment to a user via UE device 120A. The prompting data sent at block 1104 can be the prompting data determined at block 1103. In one embodiment, the prompting data determined at block 1103 can be text based prompting data, and the data sent at block 1104 can be synthesized voice based data synthesized from the text based prompting data. Enterprise system 110 can generate synthesized voice based data from text based data using a text to speech conversion process.

In response to the receipt of the prompting data, a user of UE device 120A at block 1204 can send returned voice data defined by a user using an audio input device of UE device 120A. In response to the receipt of the voice data, enterprise system 110 can perform blocks 1105, 1106, 1107, and 1108 to process the received voice data.

At generate block 1105, enterprise system 110 can run generating process 114 to generate one or more candidate text string associated to the voice string data sent at block 1204 and received by enterprise system 110. Enterprise system 110 performing generate block 1105 can include enterprise system 110 running generating process 114 to query predictive acoustic model 9002 of models area 2121.

Predictive acoustic model 9002 can be configured to output candidate text strings corresponding to received voice data defined by a voice string.

Predictive acoustic model 9002 can perform various processes including, e.g., phoneme segmentation, phoneme classification, and/or speaker identification. In one embodiment, predictive acoustic model 9002 can employ hidden Markov models. Hidden Markov models can be employed so that respective phonemes can have respective different output distributions. A hidden Markov model for a sequence of phonemes can be made by concatenating the individually trained hidden Markov models for separate phonemes. Predictive acoustic model 9002 can additionally or alternatively employ dynamic time warping (DTW) and/or neural networks. Predictive acoustic model 9002 can be trained with use of training data comprising historical voice clips defining a set of phonemes within a language. The historical voice clips can be from non-users of system 100, or alternatively, users of system 100. Predictive acoustic model 9002 can return candidate text strings corresponding to input voice strings without identification of the user, but in some embodiments, the user associated to an input voice string can be determined for optimizing performance of predictive acoustic model 9002. Where predictive acoustic model 9002 is optimized for performance with respect to a detected current user, predictive acoustic model 9002 can be trained with use of training data that is specific to the current user.

On completion of block 1105, enterprise system 110 can have produced multiple candidate text strings associated to the voice string data sent by the user at block 1204. In response to completion of generate block 1105, enterprise system 110 can proceed to examine block 1106. At examine block 1106, enterprise system 110 can run examining process 115 to examine preceding prompting data associated to the one or more candidate text strings generated at block 1105 and the voice data string sent at block 1204.

Examining of preceding prompting data can include subjecting the preceding prompting data to text parsing using natural language processing, which can include, e.g., sentence segmentation, topic segmentation, and grammar parsing including part of speech tagging. Sentence segmentation can include determining where a sentence ends, including, e.g., searching for periods, while accounting for periods that designate abbreviations. Topic segmentation can include assigning topics to successive sets of words of a sentence. A single sentence can be segmented by identifying topics associated to different word groupings of an identified sentence. Part of speech tagging can include tagging words of a sentence as belonging to a particular part of speech, e.g., tagging nouns, verbs, adjectives, adverbs, and pronouns within a sentence. Enterprise system 110 can use text segmentation parameter values, e.g., specifying sentence segmentation, topic specification, and part of speech tagging for generating augmented candidate text strings at block 1107. Text parsing can be performed with use of various natural language processing tools, e.g., WATSON DISCOVERY™, WATSON NATURAL LANGUAGE UNDERSTANDING™, and WATSON ASSISTANT™, available from International Business Machines Corporation.

At block 1106 according to one embodiment, enterprise system 110 can discard certain data. Enterprise system 110 applying rules based criteria can, e.g., discard from prompting data determined to include multiple sentences all but the last sentence defined by the prompting data. Enterprise system 110 applying rules based criteria can, e.g., discard from an identified last sentence determined to have multiple topics all words except the set of words defining the last topic. On completion of block 1106, enterprise system 110 can proceed to augment block 1107.

At augment block 1107, enterprise system 110 can run augmenting process 116 to augment the candidate text strings generated at block 1105. For augmenting a candidate text string, enterprise system 110 can apply various rules to transform prompting data into transformed data for attachment as prepended data to a candidate text string associated to response data of the user received at block 1204.

At augment block 1107, some exemplary transformation rules can include, e.g., (a) replacing third person pronouns of the prompting data with first person pronouns, e.g., "your"⇒"my", "you"⇒"I"; (b) changing prompting data text defining questions into statements, e.g.: "What state are you traveling to"⇒"I am traveling to the state"; and (c) Restating user directives of prompting data as first person declarations, e.g., "Please state your destination"⇒"My destination is", and (d) If no transformation can be performed, the contextual segment can be passed as-is to the next stage or not used at all. Enterprise system 110 can perform the transformation of (b) and (c) using mapping decision data structures that identify text strings within prompting data text matching template text strings, and which map transformation text to the template text strings. A mapping decision data structure for performing the transformation (b) can include the mapping data structure stored in decision data structures area 2122 of data repository 108 as shown in Table 1.

TABLE 1

| Row 1 | Template text string | Transformation text string |
|---|---|---|
| 1 | What *[noun] are you *[verb] to | I am *[verb] to *[noun] |
| 2 | Where are you *[verb] | I am *[verb] |
| 3 | . . . | . . . |

In the case that a template match using Table 1 is identified for a text string having a third person pronoun, transformation rule (b) can be given priority over transformation rule (a).

A mapping decision data structure for performing the transformation (c) can include the mapping data structure stored in decision data structures area 2122 of data repository 108 as shown in Table 2.

TABLE 2

| Row 1 | Template text string | Transformation text string |
|---|---|---|
| 1 | Please state your *[noun] | My *[noun] is |
| 2 | Let me know your *[noun] | My *[noun] is |
| 3 | . . . | . . . |

In the case that a template match using Table 2 is identified for a text string having a third person pronoun, transformation rule (c), where directives of prompting data are restated as first person declarations, can be given priority over transformation rule (a) which replaces third person pronouns of the prompting data with first person pronouns. This simplifies the mapping decision data structure even further with much less transformation text strings, thus easier to predict and maintain. With reference to Table 1 and Table 2, enterprise system 110 performing transformation (b) and (c) can include enterprise system 110 (i) subjecting a prompting data text string to natural language processing part of speech tagging to apply to part of speech tags to words of the text string, and (ii) identifying matches between a text string of the prompting data text string and a template text string stored in data repository 108 in which one or more word of the template text string is expressed in wildcard format as a part of speech.

With text defining prompting data transformed at block 1107 as described in connection with transformation processes (a)-(d), enterprise system 110 further at block 1107 can augment candidate text strings generated at block 1105 using the transformed text. Enterprise system 110 augmenting candidate text strings using the transformed text can include enterprise system 110 prepending transformed text resulting from the transformation processes (a)-(d) to the candidate text strings generated at block 1105. Enterprise system 110 augmenting candidate text strings at block 1107 can include lengthening, i.e., adding text prior to the start of the candidate text strings. Enterprise system 110 augmenting candidate text strings at block 1107 can include providing augmented candidate text strings, e.g., the candidate text strings having prepended text resulting from the transformation of prompting data using transformation processes (a)-(d).

On completion of augment block 1107, enterprise system 110 can proceed to decision block 1108. At decision block 1108, enterprise system 110 can select between augmented candidate text strings provided using the augmentation process of block 1107. For performing block 1108, enterprise system 110 can run action decision process 117 to select as a resulting transcription resulting from received voice data a certain candidate augmented text string from a set of candidate text strings. Enterprise system 110 performing block 1108 can include enterprise system 110 querying predictive language model 9004 using the augmented candidate text strings provided at block 1107.

Predictive language model 9004 can be configured to return confidence parameter values associated to each of the respective candidate text strings, including un-augmented text strings and augmented text strings. The confidence parameter values can be of one or more classifications. Predictive language model 9004 can be a language model configured to return one or more confidence parameter values in response to query data which comprises a candidate text string. A confidence parameter value can indicate a likelihood that a candidate text string represents the intended content of a received voice data of a user.

Predictive language model 9004 configured as a language model can provide a probability distribution over a sequence of words. Given a sequence of words of length m, predictive language model 9004 can assign a probability to the whole sequence. Predictive language model 9004 can employ neural networks to represent words in a distributed way as non-linear combinations of weights in a neural network for approximation of the language function. The employed neural network architecture can be, e.g., feed forward or recurrent. Neural networks defining predictive language model 9004 can be trained to predict a probability distribution over a vocabulary with use of neural network training algorithms, e.g., stochastic radiant descent with back propagation. Training data sets for training predictive language model 9004 can include text strings defining a language.

Predictive language model 9004 herein can be trained as a general language model or a conversation stage specific language model. A general language model can be trained using training data of a general topic domain, such as the general topic domain of the current IVR application, and/or the enterprise to of the current IVR application and enterprise. A general language model herein can also be provided by a commercial off the shelf (COTS), i.e., out of box language model that is trained generally on a major language, e.g., the English language. Training data for training a general language model provided by a COTS general language model can comprise, e.g., thousands to millions of text strings common in the specified language.

Predictive language model 9004 trained as a general language model can be available in pretrained form, and its use can alleviate tasks attendant to custom training of a predictive language model.

Providing predictive language model 9004 as a general language model can include training predictive language model 9004 using training data generally relating to IVR application 112. Such training data can include, e.g., a general conversation log of an IVR session, without a requirement of parsing and tracking the conversation data for association to a particular conversation stage and dialog tree node. Providing predictive language model 9004 as a general language model can include training predictive language model 9004 using training data generally relating to an enterprise associated to IVR application 112. Such training data can comprise text strings, e.g., from product specifications of products offered by the enterprise, including service products, training documents, procedure documents, and the like. Providing predictive language model 9004 as a general language model can include training predictive language model 9004 using training data generally relating to an industry associated to IVR application 112. Such training data can include, e.g., text strings from information technology textbooks in the case the topic domain is information technology or medical textbooks in the case the topic domain is medical. Providing predictive language model 9004 as a general language model can also include using a pre-trained COTS general language model. Providing predictive language model 9004 as a general language model by applying training data generally relating to IVR application 112, its associated enterprise, and/or its associated industry can include (a) applying additional training data to a pre-trained COTS general language model, or (b) applying training data to general language model that is not pretrained. In the (a) use case, a COTS general language model can be used as a starting point, and the general language model can be adapted as an IVR application aware, enterprise aware, and/or industry aware general language model by further training of the COTS general language model using IVR application, enterprise, and/or industry specific textual training data.

In one embodiment, predictive language model 9004 can be configured as a conversation stage specific language model. Predictive language model 9004 can be provided as a conversation stage specific topic domain language model dedicated to a topic domain of a specific conversation stage of an IVR session, e.g., a conversation associated to a certain dialog stage of an IVR session, which dialog stage can be associated to a node of dialog decision tree 3002 as shown in FIG. 6. Training data for training a conversation stage specific language model for a specific conversation stage can include historical usage data related to the specific conversation stage. A conversation stage specific language model can be trained selectively using training data of a certain conversation stage of an IVR session, e.g., as defined by a certain dialog tree node of a dialog tree controlling operation of an IVR session. Embodiments herein recognize that while deploying conversation stage specific language models can be advantageous, their use can require additional program complexity and computing resource consumption, e.g., in terms of collection and application of training data.

In some use cases herein, use of conversation stage specific language models can be avoided. In some use cases herein, use of conversation stage specific language models can be managed in view of complexity and computing resource costs associated to such usage.

Embodiments herein recognize complexity and computing resource expenses associated to use of a conversation stage specific language model. Because training data for training a conversation stage specific language model can be inherently limited, deployment of a conversation stage specific language model can require not only deploying, storing, and querying numerous models, but iterative collecting and maintaining historical usage data for application as training data and applying such training data for optimization of the models and multiple models where multiple conversation stage specific models are deployed. Embodiments herein recognize that complexity and computing resource conservation advantages can be obtained by use of general language models as described herein. Use of a general language model can alleviate complexity and computing resource utilization associated to deployment, storing, querying, or training a conversation stage specific language model, e.g., associated to respective ones of conversation stages of an IVR session corresponding to nodes of the dialog decision tree 3002 of FIG. 6.

At block 1108, enterprise system 110 can query predictive language model 9004 with a plurality of candidate text strings associated to the input voice string data input by the user at block 1204. Embodiments herein can facilitate use of predictive language model 9004 configured general language model. With use of a general language model, computing resource requirements of system 100 can be reduced. Embodiments herein recognize that text string augmentation at block 1107 can facilitate use of a general language model at block 1108 and can alleviate reliance on conversation stage specific language models at block 1108. Embodiments herein recognize that by application of augmented text strings having additional words, a general language model can be more likely to return reliable results. For example, a longer input text string with more words can be more likely to match historical text strings used as training data for training a language model than shorter text strings. With use of a general language model rather than a conversation stage specific language model, computing resource utilization associated to the deployment, training, and updating training of a plurality of conversation stage specific language models can be alleviated. For determining the predictive language model(s) to query at block 1107 and block 1108, enterprise system 110 can examine a control registry of models area 2121, an example of which is shown in Table 4. In one embodiment, enterprise system 110 can be configured to selectively perform augment block 1107 in the case a general language predictive model is active and/or to be subject to performance monitoring for the current conversation stage.

The plurality of candidate text strings input to predictive language model 9004 at block 1108 can include each candidate text string generated by predictive acoustic model 9002 at block 1105 in response to input voice string data and each augmented candidate text string returned by enterprise system 110 at block 1109. For each input candidate text string input into predictive language model 9004, predictive language model 9004 can return one or more confidence level parameter values. The one or more confidence level parameter values can include, e.g., a contextual confidence level parameter value, a transcription confidence level parameter value, and a domain confidence parameter value. Predictive language model 9004 can return a higher than baseline contextual confidence level parameter value when an input text string comprising multiple successive words strongly matches historical text strings used as training data for training predictive model. Predictive language model 9004 can return a higher than baseline transcription confidence level parameter value when individual words defining an input text string strongly match individual words of historical text strings used as training data for training predictive language model 9004. Predictive language model 9004 can return a higher than baseline topic domain confidence level parameter value when one or more word defining an input text string strongly match individual one or more word characterizing a current topic domain associated to the current IVR session, e.g., industry topic domain, enterprise topic domain, and/or conversation topic domain.

Enterprise system 110 at block 1108 on receiving returned confidence level parameter values can aggregate confidence level parameter values for the respective candidate input text strings, and at block 1108 can return the action decision to select the highest aggregate confidence level scoring candidate input text string as the returned transcription for the input voice data string sent at block 1204. Aggregating of confidence level parameter values can include, e.g., providing an average of the values, providing a weighted average of the values, providing a geometric mean of the values.

Enterprise system 110 at block 1108 can send the returned text based transcription for storage into data repository 108 at block 1083, and data repository 108 can store the returned transcription at block 1083 into logging area 2123 of data repository 108. When sending the returned text at block 1108, enterprise system 110 can tag as metadata for the returned transcription an identifier for the current conversation stage, which conversation can map to a node identifier for dialog decision tree of the current IVR session as explained with reference to dialog decision tree 3002 as described in FIG. 6. Enterprise system 110 running IVR application 112 can then use the returned transcription to derive an intent of a user, e.g., with use of semantic analysis. With intent derived, enterprise system 110 running IVR application 112 can advance an IVR session to an appropriate next conversation stage, e.g., using dialog decision tree 3002 as shown in FIG. 6. In one example for deriving an intent, enterprise system 110 running IVR application 112 can provide a correspondence score of a returned transcription in relation to a plurality of candidate intents, such as the candidate intents associated to edges of the dialog decision tree 3002 of FIG. 6. Embodiments herein recognize that if an erroneous transcription is returned at block 1108, enterprise system 110 can derive the wrong intent for the user, and can advance a current IVR session to an improper next stage.

Upon completion of block 1109, enterprise system 110 can proceed to block 1110. At block 1110, enterprise system 110 can perform training of predictive language model 9004. The training at block 1110 can include updating the training of predictive language model 9004 (FIG. 3) using the transcription sent at block 1109 and stored in data repository 108. Data repository 108 can respond to requests for stored logging data at receive/respond block 1084. Training of predictive models stored in model area 2121 can be ongoing and occurring in the background simultaneously with the performance of other processes such as processes defined by the loop of blocks 1103 to 1111. While training can be performed at block 1110, embodiments herein can perform reliability with little or no updated training of predictive language model 9004. In some use cases, where predictive language model 9004 is configured as a common general language model for a plurality of conversation stages, enterprise system 110 running IVR application 112 can include enterprise system 110 performing a lightweight training procedure for training predictive language model 9004. The lightweight training procedure can include, at the end of an IVR session (block 1111), applying session logging data of logging area 2123 from the completed session as training data to the common general language model. For determining whether to perform training at block 1110, enterprise system 110 can examine a control registry of models area 2121, an example of which is shown in Table 4. In one embodiment, enterprise system 110 can be configured to selectively perform training at block 1110 selectively on the condition that a conversation stage specific language model is active for the current conversation stage. In one embodiment, enterprise system 110 can be configured to refrain from and avoid training at block 1110 on the condition that only a common general language model is active for the current conversation stage. In one embodiment, enterprise system 110 can be configured so that when a common general language model is active for one or more conversation stage, the described lightweight training procedure is used, wherein at the end of an IVR session (block 1111), session logging data of logging area 2123 from the completed session is applied as training data to the common general language model.

As set forth herein, by use of features such as candidate text string augmentation by running of augmenting process 116, predictive language model 9004 can be configured as a general language model which can be reliably used for returning confidence parameter values associated to input candidate text strings, without iteratively updating training of predictive language model 9004. By contrast, where predictive language model 9004 is configured as a conversation stage specific language model, the specific conversation stage training data for training the predictive language model can be limited, and the reliable use of the model can be dependent on iteratively updating training of the predictive model. Thus, in some embodiments, training action at block 1110 can be performed in the case predictive language model 9004 used at block 1108 was configured as a conversation stage specific language model and can be avoided at block 1110 in the case predictive language model 9004 used at block 1108 was configured as a conversation stage specific language model. In some embodiments, training action at block 1110 can be performed in the case predictive language model 9004 used at block 1108 was configured as a general language model.

On completion of block 1110, enterprise system 110 can proceed to block 1111. At block 1111, enterprise system 110 can determine if the current IVR session has been terminated, e.g., by user selection, time out, etc. For the time that a current IVR session has not been terminated, enterprise system 110 can iteratively perform the loop of blocks 1103 to 1111. In subsequent performances of prompting block 1103, i.e., after an initial greeting, enterprise system 110 can use the returned transcription sent at block 1109, e.g., to derive intent and the proper next stage, and to further adapt the prompting data determined at block 1103 and presented at block 1104. Enterprise system 110 can subject the prior returned transcription sent at block 1109 to natural language processing to extract topic parameter and sentiment parameter values and can select from pre-stored candidate text strings defining prompting data using the derived topic and/or sentiment parameter values. Derived topic and sentiment parameter values can also be used to add prestored text to a text string for use as prompting data (e.g., to adapted prompting data for a certain detected user sentiment).

When enterprise system 110 determines that a session has been terminated at block 1111, enterprise system 110 can proceed to block 1112. At block 1112, enterprise system 110 can return to a stage preceding block 1103 to wait for the next chat initiation data.

Further aspects of embodiments herein are set forth in reference to Example 1.

EXAMPLE 1

At block 1103, enterprise system 110 running IVR application 111 determines the prompting data "What state are you traveling to?" and stores the prompting data into data repository 108 at block 1081. Enterprise system 110 running IVR application subjects the text based prompting data to text to speech conversion to present synthesized voice base prompting data to the user at block 1104. The user sends voice string data at block 1204 which enterprise system 110 running IVR application 111 feeds as query data into predictive acoustic model 9002. For generation of candidate text strings by enterprise system 110, predictive acoustic model 9002 at block 1105 outputs the candidate text strings (a) "I'll ask her" and (b) "Alaska". At block 1106, enterprise system 110 running IVR application 111 examines the stored prompting stored at block 1082 using text parsing to extract characterizing data of the prompting data. At block 1107, enterprise system 110 running IVR application 111 augments the candidate text strings using the characterizing data and content of the prompting data. At block 1107, enterprise system 110 determines prepended text for adding to the candidate text strings as "I am traveling to state of". At block 1107, enterprise system 110 generates augmented candidate text strings by adding the prepended text to the prior determined candidate text strings. At block 1107 enterprise system 110 can generate the augmented text string (c) "I am traveling to state of I'll ask her", and (d) "I am traveling to state of Alaska." At block 1108, enterprise system 110 running IVR application 111 queries predictive language model 9004, configured as a general language model using a plurality of candidate text strings. The candidate text strings include the referenced candidate text strings (a) "I'll ask her" and (b) "Alaska", (c) "I am traveling to state of I'll ask her" and (d) "I am traveling to state of Alaska". Predictive language model 9004 can be configured to return confidence level parameter values in response to the query data. Predictive language model 9004 can return context confidence level parameter values, transcription confidence level parameter values, and domain confidence level parameter values. Predictive language model 9004 can return confidence level parameter values as shown in Table 3.

TABLE 3

| Candidate text string | Context confidence level parameter value | Transcription confidence level parameter value | Domain confidence level parameter value | Aggregate |
| --- | --- | --- | --- | --- |
| (a) "I'll ask her" | 0.3 | 0.7 | 0.5 | 0.50 |
| (b) "Alaska" | 0.2 | 0.7 | 0.5 | 0.47 |
| (c) "I am traveling to state of I'll ask her" | 0.1 | 0.8 | 0.5 | 0.47 |
| (d) "I am traveling to state of Alaska" | 0.9 | 0.5 | 0.5 | 0.63 |

Referring to Table A with reference to illustrative data, it is seen a strong context confidence level parameter value can result in selection of candidate string (d). It is also seen that without the candidate text string augmentation to prepend text to the candidate texts strings, enterprise system 110 running IVR application 111 might select candidate text string (a) "I'll ask her" over candidate text string (b) "Alaska."

End of Example 1

In one embodiment, as is referenced in Example 1, enterprise system 110 can be configured to perform augmentation described at block 1107 for each incoming voice string of a user, i.e., for each candidate text string output by predictive acoustic model 9002. In another embodiment, enterprise system 110 can apply augmentation at block 1107 selectively, e.g., only for certain qualifying voice strings. Referring to Table 3, it is seen that predictive language model 9004, configured as a general language model can, for an incoming voice string of a user, output confidence level parameter values for un-augmented candidate text strings (a) and (b) output by predictive acoustic model 9002. According to one embodiment, enterprise system 110 can be configured to refrain from performing augmenting at block 1107 for an incoming voice string conditionally on the condition that a confidence level parameter value returned from predictive language model 9004 for one or more candidate text string satisfies a threshold. According to one embodiment, enterprise system 110 can be configured to refrain from performing augmenting at block 1107 for an incoming voice string conditionally on the condition that an aggregate confidence level parameter value returned from predictive language model 9004 (which can be configured as a common general language model) for one or more candidate text string output by predictive acoustic model 9002 satisfies a threshold of 0.55. In reference to the illustrative data of Table 1, neither of the aggregate confidence level parameter values for candidate text string (a) or (b) satisfies the threshold, and so augmentation at block 1107 is in fact performed. If one of the un-augmented candidate text stings in reference the described example in view of the illustrative data of Table 3 yielded an aggregate confidence parameter value of 0.55, enterprise system 110 would avoid performance of augmentation at block 1107, and instead would use the highest scoring un-augmented candidate text strings.

Alternative or additional conditions can be used to trigger performance of augmenting at block 1107. Embodiments herein recognize that speech to text conversion can be less reliable when there are a smaller number of words and/or phonemes in a voice string. According to one embodiment, enterprise system 110 can be configured to refrain from performing augmenting at block 1107 for an incoming voice string conditionally on the condition that a word count of one or more candidate text string returned from predictive acoustic model 9002 satisfies a threshold. According to one embodiment, enterprise system 110 can be configured to refrain from performing augmenting at block 1107 for an incoming voice string conditionally on the condition that a phoneme count of one or more candidate text string returned from predictive acoustic model 9002 satisfies a threshold. According to one embodiment, enterprise system 110 can be configured to perform augmenting at block 1107 for an incoming voice string conditionally on the condition that a confidence level parameter value returned from predictive acoustic model 9002 for each returned text string is less than a threshold. According to one embodiment, enterprise system 110 can be configured to perform augmenting at block 1107 for an incoming voice string conditionally on the condition that a word count for each returned text string returned from predictive acoustic model 9002 is less than a threshold. According to one embodiment, enterprise system 110 can be configured to perform augmenting at block 1107 for an incoming voice string conditionally on the condition that a phenome count for each returned text string returned from predictive acoustic model 9002 is less than a threshold. According to one embodiment, enterprise system 110 can be configured to perform augmenting at block 1107 for an incoming voice string conditionally on a condition in dependence on one or more of (a) a confidence level parameter value (output by predictive language model 9004), a (b) word count for one or more candidate word string returned from predictive acoustic model 9002, or (c) phoneme count for one or more candidate word string returned from predictive acoustic model 9002.

Embodiments herein recognize that configuring IVR application 111 so that augmenting at block 1107 is performed only selectively and conditionally on an observed condition can improve operation speed and can also conserve computing resources, which can be of increased importance as a number of instances of IVR application 111 running simultaneously increases.

Enterprise system 110 if some embodiments can store and update in models area 2121 of data repository 108 a control registry that specifies attributes of one or more predictive language model associated to respective conversation stages of IVR application 111. Example control registry data is illustrated in Table 4.

TABLE 4

| Row | Conversation stage (dialog tree node) | Common general language predictive model (deployed for plural nodes) status | Conversation stage specific predictive model status |
| --- | --- | --- | --- |
| 1 | A001 | Active | Never instantiated |
| 2 | A002 | Active | Never instantiated |
| 3 | A003 | Inactive (with | Instantiated; Active |

TABLE 4-continued

| Row | Conversation stage (dialog tree node) | Common general language predictive model (deployed for plural nodes) status | Conversation stage specific predictive model status |
|---|---|---|---|
| | | performance monitored) | |
| 4 | A004 | Active | Previously instantiated; Now inactive |
| 5 | A005 | Active | Previously instantiated; Now inactive and deleted |
| 6 | A006 | Active | Instantiated; Active |
| 7 | A007 | Active | Never instantiated |

Features set forth herein can facilitate use of a common general language predictive model for plurality of nodes of an IVR session. Use of a common general language predictive model can facilitate minimal or no use of conversation state specific predictive models for return of predictions in relation to conversation stages.

In some embodiments, IVR application 111 can be configured to initially deploy for each possible conversation stage of an IVR session, e.g., mapping to nodes of dialog decision tree 3002 of FIG. 6 predictive language model 9004 configured as a general language model and the same common general language model can be deployed for each stage and node. However, during deployment of system 100, enterprise system 110 can monitor the performance the general language model commonly deployed for each node, e.g., by examination of user voice string inputs at a next conversation stage. Enterprise system 110 can perform natural language processing to monitor for key words indicating an erroneous transcription at a prior stage, e.g., "I did not ask that question," or a user negative sentiment below a low threshold. Enterprise system 110 can monitor performance additionally or alternatively by monitoring confidence level parameter values output by predictive language model 9004 for candidate text strings including augmented candidate text strings as indicated in Table 3. Enterprise system 110 can iteratively score each conversation stage (mapping to nodes) over a time window of one or plurality of IVR sessions for the same user or different users, and, on the confidence level scoring for a certain conversation stage and dialog decision tree node over a time window of one or more session falling below a low threshold, enterprise system 110 can deploy for the conversation stage and dialog decision tree node a conversation stage specific language model specifically for the conversation stage.

In deploying the new conversation stage specific language model for the certain conversation stage, enterprise system 110 can train the new conversation stage specific language model for the stage using historical returned transcriptions for the stage stored in data repository 108 and tagged with metadata indicating the conversation stage and dialog decision tree node of the stage. In some use cases, when a conversation stage specific model is responsively deployed for a certain conversation stage and dialog tree node in response to performance monitoring, enterprise system 110 can mine historical conversation logging data of logging area 2123 for conversation data of historical sessions specifically associated to the certain conversation stage and dialog tree node and can selectively use that selectively obtained conversation data for training of the newly deployed conversation stage specific predictive model.

In another example, enterprise system 110 running IVR application 112 can include enterprise system 110 (a) using for return of speech to text transcriptions for a certain conversation stage mapping to a dialog tree node a conversation stage specific language model; (b) monitoring performance of use of a general language model for the certain stage over one or more IVR session; and (c) decommissioning the conversation stage specific language model on the condition that the general language model, which can be commonly applied for a plurality of dialog tree nodes, is producing threshold level exceeding confidence level results. The decommissioning can be accompanied by model deletion for economization of computing resourced and the same process can be carried out for multiple conversation stages mapping to different IVR dialog tree nodes.

In some embodiments, enterprise system 110 can store for each conversation stage mapping to a dialog decision tree node multiple models, such as a first generic language model and a second conversation stage specific model. Enterprise system 110 running IVR application 112 can query both models at block 1108 using an ensemble model technique.

Enterprise system 110 can be configured so that in the running of IVR application 111 conversation stage specific predictive models can be instantiated selectively, e.g., only on an as-needed basis. Spawning of a conversation stage specific predictive model on an as-needed basis can be in response to performance monitoring, e.g., wherein voice strings expressing indicators of flawed transcriptions, or user sentiment are monitored. Performance monitoring can alternatively or additionally include monitoring confidence levels returned from the predictive language model 9004.

In another aspect, enterprise system 110 can be configured so that once a conversation stage specific protective model is instantiated and deployed on a limited as-needed basis for a certain conversation stage mapping to a certain dialog tree node, performance monitoring be carried out so that conversation stage servicing of the certain conversation stage can be returned to servicing by a common general language predictive model responsively to the determination that the common general language predictive model is able to provide satisfactory performance.

In one use case scenario, enterprise system 110 can be configured so that in an initial session of IVR application 111, all conversation stages of an IVR session can be serviced by common general language predictive model for each respective node. When a user voice string is received for a certain conversation stage, the performance of the common general language predictive model can be monitored, i.e., for the current session or over a time window of multiple sessions. Monitoring of performance of predictive language model 9004 can include monitoring confidence level parameter values output by predictive language model 9004 configured as a common general language model for candidate text strings including augmented candidate text strings as indicated in Table 3. In response to the monitoring indicating that performance is not satisfactory according to a predetermined criteria for a certain conversation stage, a conversation stage specific predictive model can be instantiated for the certain conversation stage.

After instantiating a conversation stage specific predictive model for the certain conversation stage, enterprise system 110 can continue to monitor the output of the common general language model for the certain conversation stage, e.g., over a time window of one or a plurality of sessions, though the common general language model may have been deactivated for purposes of returning transcription (it also might be active in an ensemble model configuration). Monitoring of performance of predictive language model 9004 can include monitoring confidence level parameter values output by predictive language model 9004 configured as a common general language model for candidate text strings including augmented candidate text strings as indicated in Table 3. Enterprise system 110 can be configured to return servicing of the certain conversation stage in response to a determination that performance (e.g., by monitoring a confidence level parameter value) of the general language model is satisfactory.

Enterprise system 110 can be configured so that when performance monitoring of the common general language predictive model indicates that the common general language predictive model for the certain conversation stage is satisfactory, enterprise system 110 can deactivate the conversation stage specific predictive model for that conversation stage and return servicing of the conversation stage to the general common language predictive model. Thus, computing resources devoted to collecting, organizing, and applying training data for the specific conversation stage specific predictive model can be alleviated.

In some scenarios, the performance level of a common general language predictive model can improve over time after the initial miming of IVR application 111. Over several instances of IVR application 111 running for performance of a plurality of IVR sessions and where a common general language predictive model is trained with use of IVR application specific training data e.g., conversation log data, from a plurality of IVR sessions of a certain IVR application, predictive language model 9004 configured as a common general language predictive model performance can improve, particularly with augmenting process 116 augmenting the performance of such common general language predictive model.

In some use cases a conversation stage specific predictive model may produce better performance than a common general language predictive model for a certain conversation stage for a certain time after an initial running of IVR application. However, over the course of several historical sessions of IVR application 111, the common general language predictive model can become smarter with more training and thus provide a better performance option than conversation stage predictive model in addition to providing the reduced complexity and computing resource advantage set forth herein. Embodiments herein facilitate by performance monitoring the toggling between the common general language predictive model and a conversation stage specific predictive model for servicing certain conversation stage.

Referring to Table 4, various statuses are possible. For conversation stage A001, the common general language predictive model is active and the conversation stage specific predictive model for that conversation stage has never been instantiated. Referring to conversation stage A003, the conversation stage specific predictive model is instantiated and active and the common general language predictive model, while inactive for purposes of returning transcriptions and driving IVR decisions, continues to produce outputs for purposes of permitting its performance to be monitored for potential switchback to the common general language predictive model for servicing the particular conversation stage A003. Referring to conversation stage A006, both the common general language predictive model and the conversation stage specific protective model are active.

Figure 7:
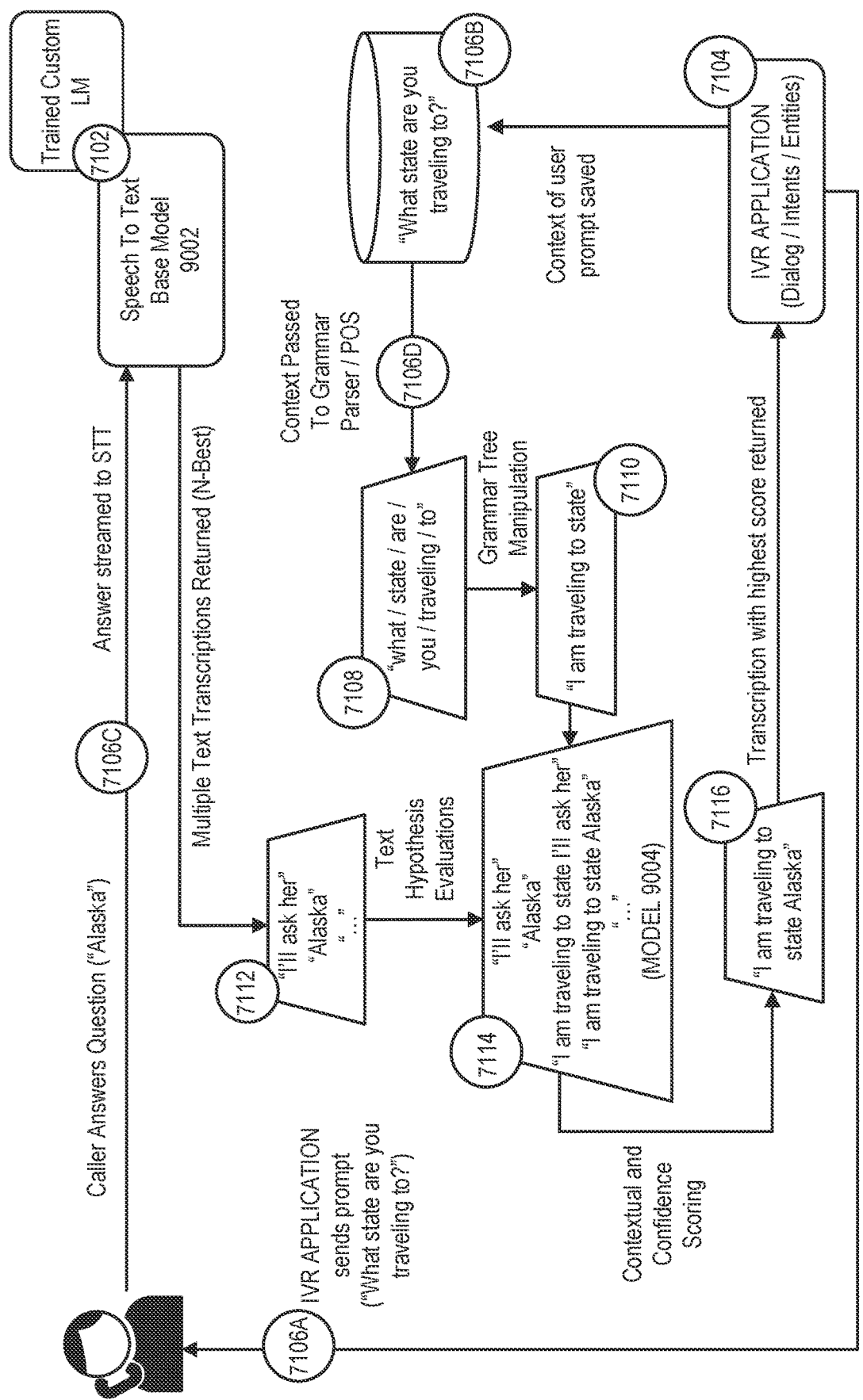
FIG. 7 is a flowchart illustrating a method for performance by an enterprise system interoperating with a UE device according to one embodiment.

Additional aspects of embodiments herein are described with reference to the flowchart of FIG. 7. Referring to block 7102, a predictive acoustic model 9002 can be trained, e.g., using voice data of user of system 100 or other users. Referring to block 7104, enterprise system 110 running IVR application 111 can determine prompting data to send to a user, e.g., in dependence on derived intents, dialog, or entities. At block 7106A, enterprise system 110 can subject the text based prompting data to text to speech conversion to send synthesized speech prompting data to the user, and at block 7106C the user can send voice string data to enterprise system 110 in response to the synthesized speech prompting data. Enterprise system 110 running IVR application 111 can query predictive acoustic model 9002 using the received voice string data to return a candidate text string associated to the voice string data. At block 7106B, enterprise system 110 running IVR application 111 can store the prompting data as context to data repository 108. At block 7106D, enterprise system 110 running IVR application 111 can subject the IVR prompting data to text parsing to extract characterizing data of the text based prompting data. At block 7110, enterprise system 110 running IVR application 111 can determine prepended text to add the candidate text strings output by predictive acoustic model 9002 at block 7102. At block 7114, enterprise system 110 running IVR application 111 can add the prepended text determined at block 7110 to the candidate text strings output by predictive acoustic model 9002 at block 7102. Enterprise system 110 running IVR application 111 at block 7114 can query predictive language model 9004 using multiple candidate text strings. The multiple text strings can include the candidate text strings output by predictive acoustic model 9002 can include augmented versions of the referenced candidate text strings modified by adding the prepended text determined at block 7110. At block 7114, predictive language model 9004, on being queried, can return a set of one or more confidence level parameter values. At block 7116, enterprise system 110 running IVR application 111 can examine the returned confidence level values and can select as the returned transcription the highest scoring candidate text string. Enterprise system 110 running IVR application 111 at a next iteration of block 7104 can then use the returned transcription to determine next prompting data for presentment to the user.

Referring to block 7102, a predictive acoustic model 9002 can be trained: (a) a developer user can train a predictive acoustic model to provide predictive acoustic model 9002 or an out of box, commercial off the shelf (COTS) predictive acoustic model can be used to provide predictive acoustic model 9002. Referring to block 7104, a speech model can be used in a conversational context. A commercial voice chat solution can be deployed for facilitation of an IVR session, e.g., Watson Assistant™ for voice interaction. Referring to block 7106A, the system can prompt the user and starts a STT recognition request. Referring to block 7106B, the last prompt can be saved as context. Referring to block 7106C, the recognition can use existing APIs (e.g., websocket connection). Referring to block 7106D, the context is passed along with the user audio. Referring to block 7108, the system segments the contextual string into a minimally useful component. The contextual string can be sent through a typical grammar parse (sentence, part of speech). If the context is a single short sentence, no segmentation may be performed. If the context contains multiple sentences, the last sentence can be used. If the context contains multiple segments within a sentence, the last segment can be used. Referring to block 7110, a grammar tree manipulation can be performed on the contextual string to make it suitable for prepending. Various transformations that can be performed can include: (a) Pronouns are replaced: ex: "your"⇒"my", "you"→"I"; (b) Questions are changed to statements: "What state are you traveling to"⇒"I am traveling to the state"; (c) Statements are truncated, for example, via templates:

"Please state your destination"⇒"My destination is"; (d) If no manipulation can be performed, the contextual segment can be passed as-is or not used at all. Referring to block 7112 predictive acoustic model 9002 configured as an STT base model can transcribe audio into textual hypotheses candidate text strings. Referring to block 7114, text hypotheses can be evaluated (a) first, on an as-is basis, and (b) second, with the prepended contextual text. Each evaluated hypothesis can be scored with a "contextual match" confidence and transcription confidence. For example: (i) "I'm traveling to the state of Alaska"⇒high contextual match confidence with medium transcription confidence; (ii) "I'm traveling to the state I'll ask her"⇒low contextual match confidence and high transcription confidence (the phrase "to the state I'll ask her" has low contextual confidence (grammatically anomalous); (iii) "I'll ask her"⇒medium contextual match confidence and high transcription confidence. Contextual confidence can be derived from having a good grammar structure (part of speech, grammar). Domain confidence can also be scored (does the transcription contains a domain-specific word or phrase. Transcription score can be weighted average, geometric mean, etc., of contextual confidence, domain confidence, and transcription confidence. The candidate transcription with the highest transcription score can be returned.

Embodiments herein recognize that speech to text services can be trained for specific tasks and perform quite well when they are specifically trained. Embodiments herein recognize that multiple models can be used and an orchestrator can be provided to select the appropriate model for the appropriate task. Embodiments herein recognize that the multiple model approach can place a significant development burden on the developer and can incur computing resource cost, e.g., in terms of training multiple models.

According to one example, a chatbot, e.g., VA can present the following prompt: "What state are you traveling to? A user speaks: "Alaska". A general language model with no custom training might transcribe "I'll ask her". A conversation stage specific language model using a specific grammar or specific language model can transcribe "Alaska". Embodiments herein recognize that development and computing resource burden can be imposed with use of multiple models, including burdens associated with storing and applying training data for multiple models. Embodiments herein can facilitate use of general language models with chatbot, e.g., IVR applications.

Embodiments herein can facilitate use of a common and single general language model for a plurality, and in some use cases all conversation stages of an IVR application. Such an architecture can facilitate simplified training. Training can be accomplished with use of textual data gathered from conversational logs into a single general language model. Embodiments herein recognize that AI services (e.g., chat, transcription) have been developed as independent microservices rather than serving a coherent joint goal.

Embodiments herein can facilitate use of a common single general language model for each of a plurality and in some cases all conversation stages of an IVR application. Embodiments herein can supplement a "speech recognition" application program interface (API) with a contextual message containing the text that prompted recognized voice string data. The speech recognition system can use the described contextual message during a text hypothesis evaluation stage to assure the transcribed response makes sense in the context of the originating request. The contextual message can be transformed into a prepended text string combined with the utterance hypothesis. In the described example, the contextual message sent to a user can be "What state are you traveling to?". During evaluation, that message can be transformed to "I'm traveling to the state of 'The hypothesis'". Thus, "I'm traveling to the state of I'll ask her" can be rejected in favor of "I'm traveling to the state of Alaska".

Embodiments herein recognize that transforming chatbot prompting data into prepended text and adding the prepended text to a candidate text string associated to input voice string data can facilitate use of a single common general language model for multiple, e.g., all conversation stages of an IVR stages. According to one aspect, longer text strings with additional words, are more likely to match to historical texts strings of past training data used to train the general language model. The common general language model can either not be trained and or trained using a simplified training procedure. A simplified training procedure can include merely extracting associated data from a conversation log associated to an entire IVR session and applying the entire conversation log to the common model, rather that separately store and apply specialized conversation data associated to particular respective conversation stages mapping to different IVR dialog decision tree nodes.

Certain embodiments herein may offer various technical computing advantages and practical applications including computing advantages to address problems arising the realm of computer systems. Embodiments herein, for example, can provide for a machine learning model training procedure for use in an IVR application having multiple communication stages wherein the respective conversation stages of the communication stages can map to nodes of a dialog decision tree. Embodiments herein can feature a single common predictive model provided by a general language model for use with first through Nth conversation stages of an IVR session. The use of a common predictive model for first through Nth conversation stages alleviates the need to organize and maintain separate training data for a plurality of conversation stage specific language models respectively corresponding to respective ones of conversation stages of an IVR application. A machine learning training procedure herein can reduce design complexity for a developer and can reduce computing resource utilization, e.g., alleviating training data maintenance tasks and training data application tasks. A machine learning training procedure for use with an IVR application as set forth herein can include simply extracting general conversation log data from a conversation log for completed IVR session an applying the conversation log data as training data without computing resource intensive tasks such as separately organizing and storing separate training data for separate conversation stages and separately training a plurality of different conversations form specific language models. Embodiments herein can include examining text based data defining prompting data presented to user by a chatbot such as a VA. Examining can include subjecting the text based data to text parsing, e.g., grammar parsing for performance of part of speech tagging to attach part of speech tags to the text based data defining prompting data. Based on a result of the examining, e.g., with use of the part of speech tags miming of an IVR application can transform the text based data defining the prompting data to provide transformed text. Candidate text strings associated to a user voice string sent in response to prompting data can be augmented using the transformed text to generate augmented candidate text strings. The augmented candidate text strings can be evaluated using predictive model configured as a language model, which in one embodiment can be a general language model commonly deployed for the first through Nth conversation stages having no associated training procedure, or alternatively, a lightweight training procedure set forth herein with reduced development complexity and with reduced computing resource utilization. Various decision data structures can be used to drive artificial intelligence (AI) decision making. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 8:
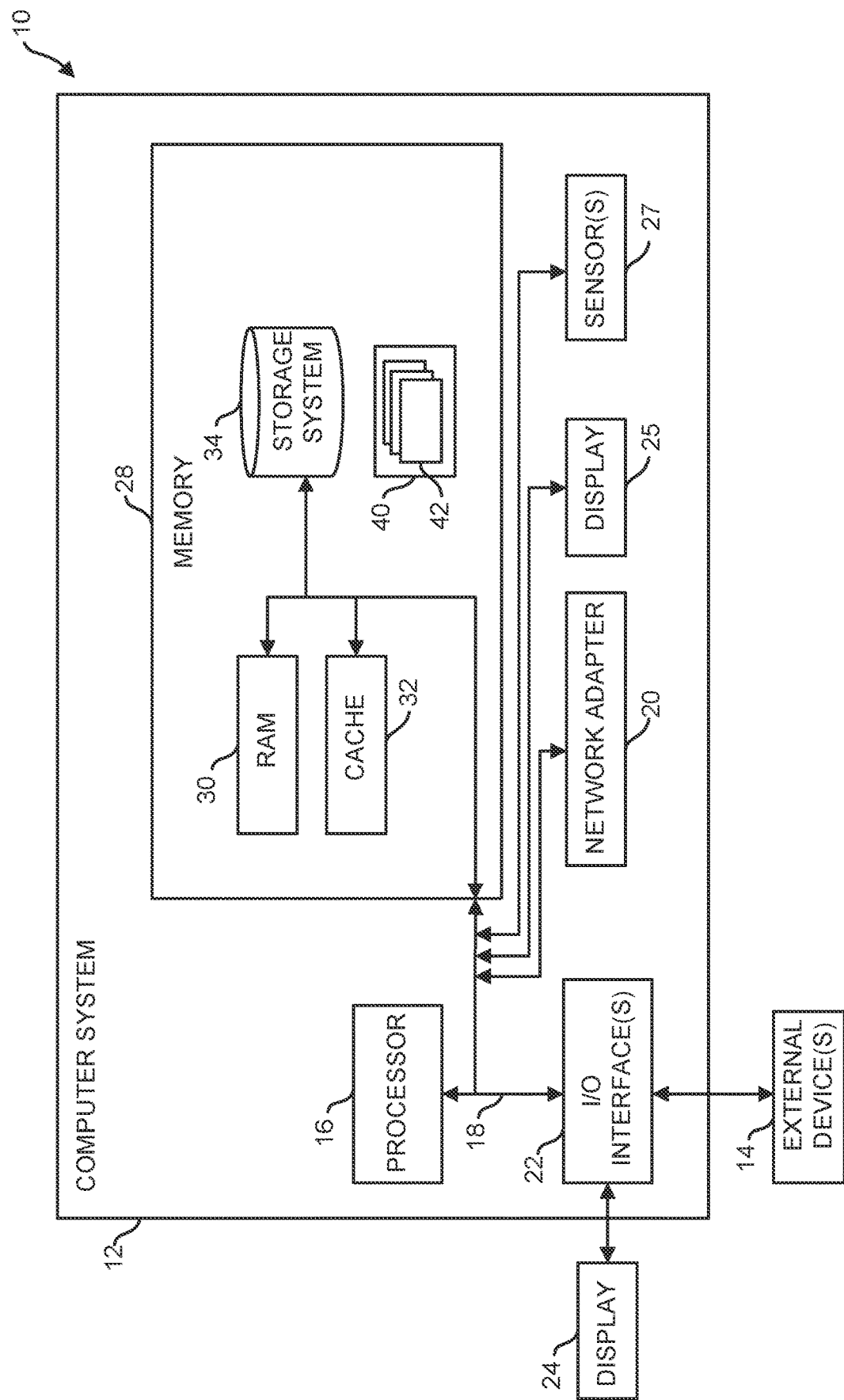
FIG. 8 depicts a computing node according to one embodiment.
Figure 9:
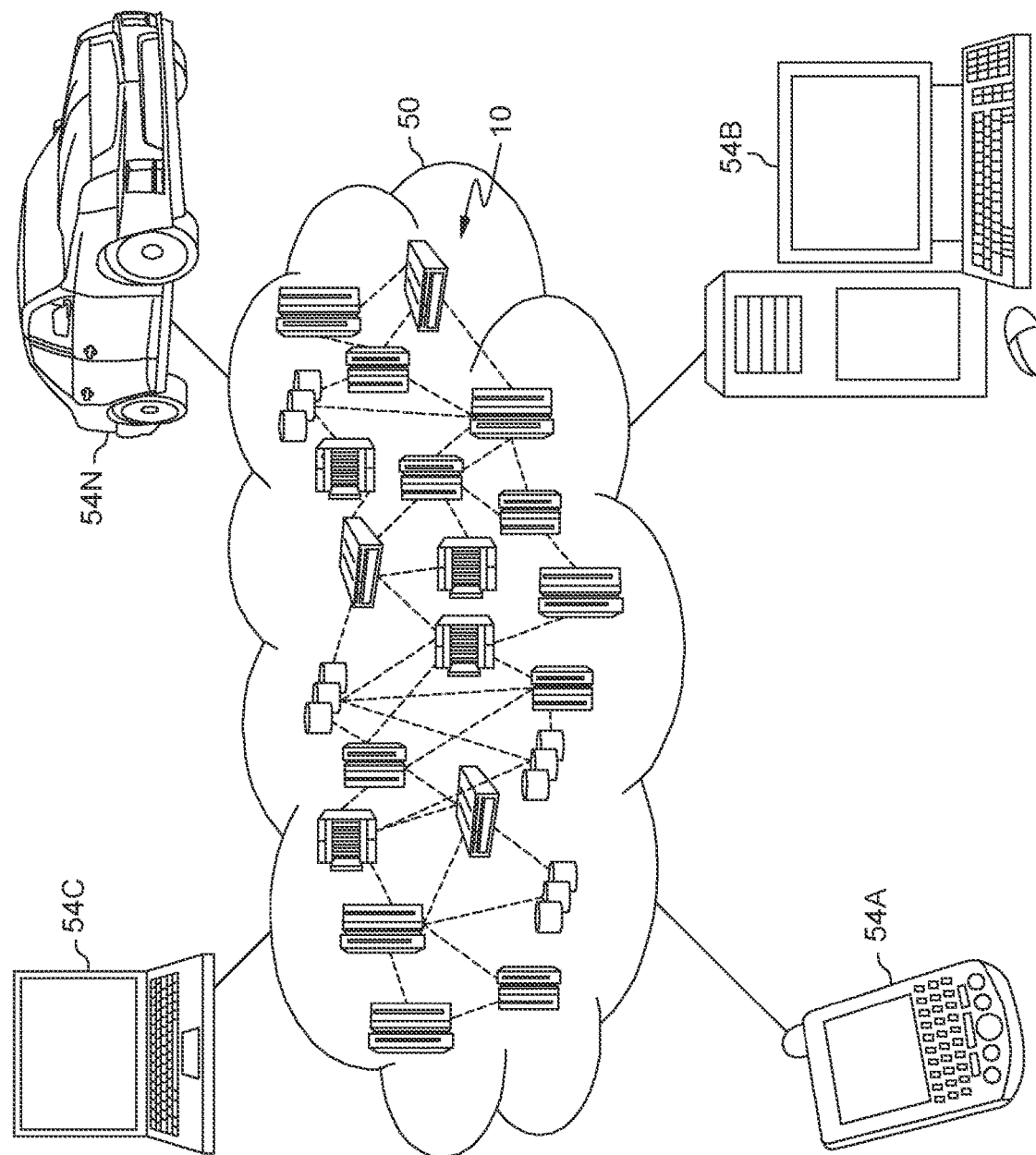
FIG. 9 depicts a cloud computing environment according to one embodiment.
Figure 10:
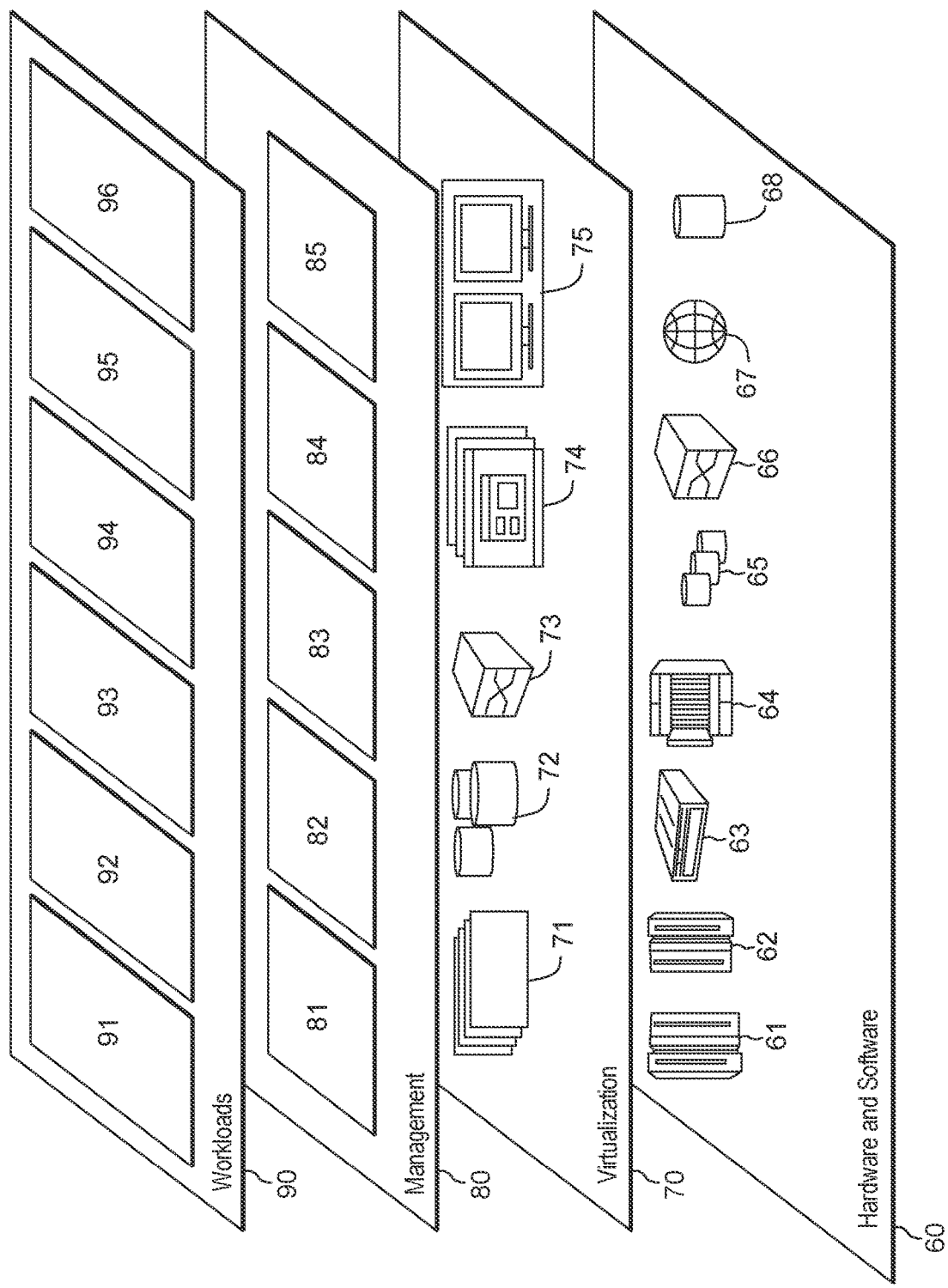
FIG. 10 depicts abstraction model layers according to one embodiment.

FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, enterprise system 110 can include one or more computing node 10 and can include one or more program 40 for performing functions described with reference to enterprise system 110 and IVR application 111 as set forth in the flowchart of FIG. 4. In one embodiment, enterprise system 110 can include one or more computing node 10 and can include one or more program 40 for performing functions described with reference to enterprise system 110 and IVR application 111 as set forth in the flowchart of FIG. 7. In one embodiment, one or more UE device of UE devices can include one or more computing node 10 and can include one or more program 40 for performing functions described with reference to a UE device as set forth in the flowchart of FIG. 4. In one embodiment, one or more UE device of UE devices can include one or more computing node 10 and can include one or more program 40 for performing functions described with reference to a UE device as set forth in the flowchart of FIG. 7. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18, and/or other output devices such as one or more audio output device connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for return of transcribed text associated to voice string data as set forth herein. The processing components 96 can be implemented with use of one or more program 40 described in FIG. 8.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
   determining, in performance of an interactive voice response (IVR) session, prompting data for presenting to a user, and storing text based data defining the prompting data into a data repository;
   presenting the prompting data to the user;
   receiving return voice string data from the user in response to the prompting data;
   generating a plurality of candidate text strings associated to the return voice string data of the user;
   examining the text based data defining the prompting data;
   augmenting the plurality of candidate text strings in dependence on a result of the examining to provide a plurality of augmented candidate text strings associated to the return voice string data, wherein the augmenting includes transforming the text based data defining the prompting data to provide transformed prompting data;
   evaluating respective ones of the plurality of augmented candidate text strings associated to the return voice string data; and
   selecting one of the augmented candidate text strings as a returned transcription associated to the return voice string data.

2. The computer implemented method of claim 1, wherein the evaluating includes querying a predictive model provided by a general language model with the respective ones of the plurality of augmented candidate text strings associated to the return voice string data, and examining returned confidence level parameter values resulting from the querying.

3. The computer implemented method of claim 1, wherein the method includes, prior to the examining and the augmenting, ascertaining, using the plurality of candidate text strings, performance of a predictive language model, the predictive language model for use in performing the evaluating, determining based on the ascertaining that the predictive language model will not perform satisfactorily for the return voice string data from the user, and performing the examining and the augmenting selectively in response to the determining.

4. The computer implemented method of claim 1, wherein the augmenting includes identifying a certain text string within the text based data defining the prompting data that is referenced within a mapping data structure stored in a data repository, wherein the mapping data structure maps text strings to transformed text strings, wherein the augmenting includes using a certain transformed text string associated to the certain text string within the mapping data structure.

5. The computer implemented method of claim 1, wherein the examining includes subjecting the text based data defining the prompting data to natural language processing for assignment of part of speech tags to the text based data, wherein the augmenting includes identifying a certain text string within the text based data defining the prompting data that matches a template text string within a mapping data structure stored in a data repository, wherein the template text string stored in data repository includes one or more term expressed in wildcard format as a part of speech.

6. The computer implemented method of claim 1, wherein the presenting includes using text to speech conversion to present the prompting data to the user in synthesized voice.

7. The computer implemented method of claim 1, wherein the examining includes subjecting the text based data defining the prompting data to natural language processing for assignment of part of speech tags to respective terms of the text based data, and using the part of speech tags to transform text based data defining the prompting data.

8. The computer implemented method of claim 1, wherein the examining includes subjecting the text based data defining the prompting data to part of speech tagging to provide part of speech tags associated to the text based data defining the prompting data, and wherein the augmenting includes transforming the text based data defining the prompting data using a tag of the part of speech tags to provide a transformed text string, and prepending the transformed text string to a text string of plurality candidate text strings.

9. The computer implemented method of claim 1, wherein the presenting includes using text to speech conversion to present the prompting data to the user in synthesized voice, wherein the evaluating includes querying a predictive model provided by a general language model with the respective ones of the plurality of augmented candidate text strings associated to the return voice string data.

10. The computer implemented method of claim 1, wherein the presenting includes using text to speech conversion to present the prompting data to the user in synthesized voice, wherein the generating the plurality of candidate text strings associated to the return voice string of the user includes querying a predictive acoustic model, wherein the evaluating includes querying a predictive model provided by a general language model with the respective ones of the plurality of augmented candidate text strings associated to the return voice string data, and examining returned confidence level parameter values resulting from the querying.

11. The computer implemented method of claim 1, wherein the augmenting includes identifying a certain text string within the text based data defining the prompting data.

12. The computer implemented method of claim 1, wherein the augmenting includes identifying a certain text string within the text based data defining the prompting data, and transforming the certain text string into a transformed text string using data repository stored data.

13. The computer implemented method of claim 1, wherein the augmenting includes prepending the transformed prompting data to respective candidate text strings of the plurality of candidate text strings.

14. The computer implemented method of claim 1, wherein the augmenting includes adapting respective candidate text strings of the plurality of candidate text strings using the transformed prompting data.

15. The computer implemented method of claim 1, wherein the examining includes subjecting the text based data defining the prompting data to natural language processing for assignment of part of speech tags to the text based data.

16. The computer implemented method of claim 1, wherein the examining includes subjecting the text based data defining the prompting data to part of speech tagging to provide part of speech tags associated to the text based data defining the prompting data.

17. A system comprising:
a memory;
at least one processor in communication with the memory;
program instructions executable by one or more processor via the memory to perform a method comprising:
determining, in performance of an interactive voice response (IVR) session, prompting data for presenting to a user, and storing text based data defining the prompting data into a data repository;
presenting the prompting data to the user;
receiving return voice string data from the user in response to the prompting data;
generating a plurality of candidate text strings associated to the return voice string data of the user;
examining the text based data defining the prompting data;
augmenting the plurality of candidate text strings in dependence on a result of the examining to provide a plurality of augmented candidate text strings associated to the return voice string data, wherein the augmenting includes transforming the text based data defining the prompting data to provide transformed prompting data;
evaluating respective ones of the plurality of augmented candidate text strings associated to the return voice string data; and
selecting one of the augmented candidate text strings as a returned transcription associated to the return voice string data.

18. A computer implemented method comprising:
determining, in performance of an interactive voice response (IVR) session, prompting data for presenting to a user, and storing text based data defining the prompting data into a data repository;
presenting the prompting data to the user;
receiving return voice string data from the user in response to the prompting data;
generating a plurality of candidate text strings associated to the return voice string data of the user;
examining the text based data defining the prompting data, wherein the examining includes subjecting the text based data defining the prompting data to natural language processing for assignment of part of speech tags to the text based data;
augmenting the plurality of candidate text strings in dependence on a result of the examining to provide a plurality of augmented candidate text strings associated to the return voice string data;
evaluating respective ones of the plurality of augmented candidate text strings associated to the return voice string data; and
selecting one of the augmented candidate text strings as a returned transcription associated to the return voice string data.

19. The computer implemented method of claim 18, wherein the augmenting includes transforming the text based data defining the prompting data.

20. The computer implemented method of claim 18, wherein the augmenting includes transforming the text based data defining the prompting data to provide transformed prompting data, and prepending the transformed prompting data to respective candidate text strings of the plurality of candidate text strings.

* * * * *